Feb. 14, 1928.
R. C. McOLVIN
PLANT SUPPORT
Filed March 7, 1927
1,659,116
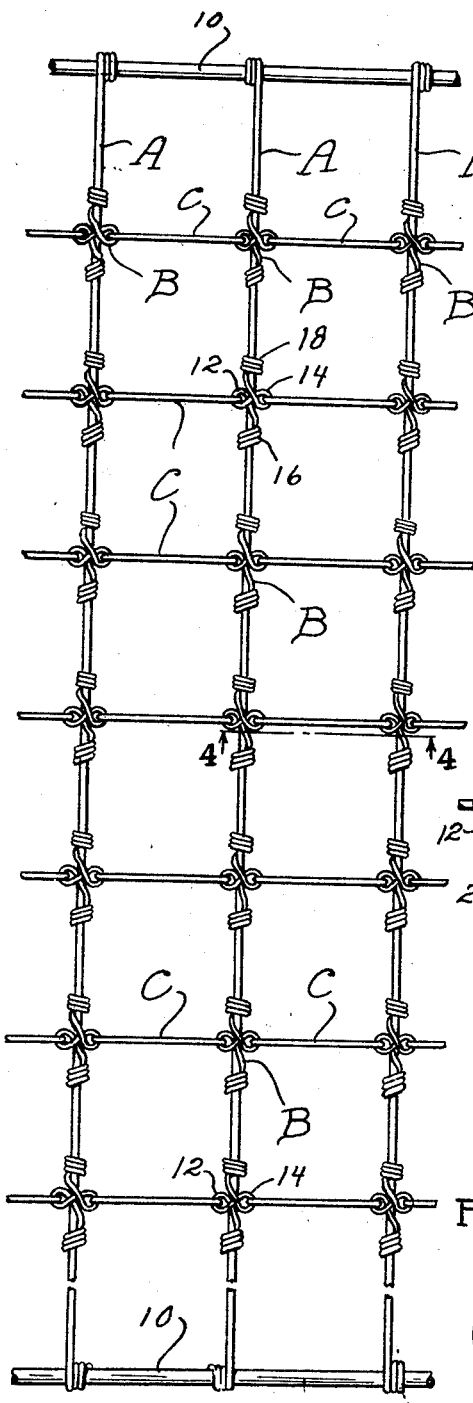
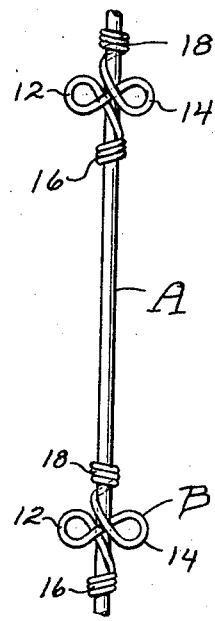
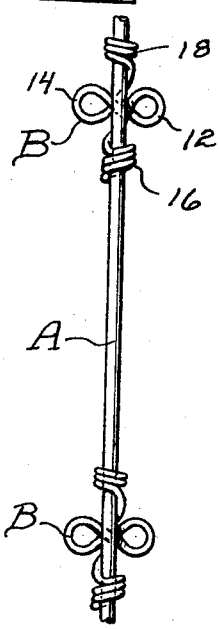
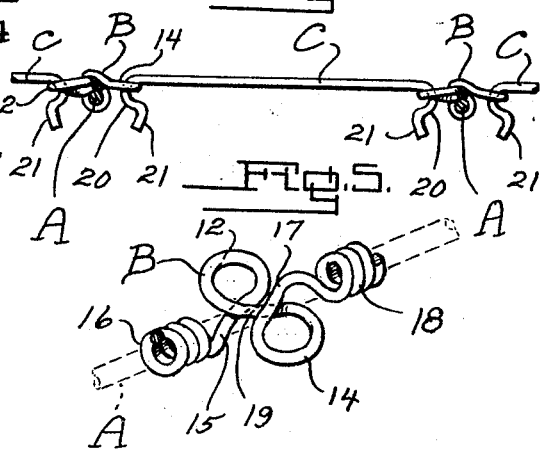
Robert C. McOlvin, Inventor
By Lancaster and Allwine, Attorneys Patented Feb. 14, 1928.

1,659,116

UNITED STATES PATENT OFFICE.

ROBERT C. McOLVIN, OF BAXTER, WEST VIRGINIA.

PLANT SUPPORT.

Application filed March 7, 1927. Serial No. 173,526.

The present invention relates to improvements in plant supports or holders.

In the growing of plants such as carnations, chrysanthemums and the like for "cut flowers", a net work support is usually provided for maintaining the plants in spaced and upright positions. With the net work support as now employed, wires are generally stretched in parallel spaced relation a full length of the beds or benches in which the plants are being grown, and then suitable cord or twine is run transversely of the wires and tied to each wire for forming a series of longitudinally and transversely aligned open squares through which the plants grow. Owing to the amount of tying of the cords to the wires required when constructing this type of support, much time and labor is required and as a general rule have not been found very satisfactory since the frequent and required watering of the plants causes the cord to rot and break which results in more work in again replacing the broken cords, and this repairing of the support after the plants are of considerable height, cannot be easily accomplished without liability of breaking some of the flowers or branches of the plants.

It is therefore a primary object of the present invention to provide an improved plant support which will overcome the objectionable features of the plant supports as now employed by enabling the transverse strands of the support to be formed of a material such as wire or the like and thus eliminating possibility of the transverse strands becoming broken and allowing the adjacent plants to move out of their proper positions.

A further object of the invention resides in the provision of an improved plant support which may be assembled for proper use in comparatively little time, and which support may be used equally well for the supporting of various kinds of plants, regardless as to whether the plants are being grown in a field or benches.

A further object of the invention resides in the provision of an improved plant support embodying features whereby the individual frames formed by the support for each plant may be varied as to size according to the particular plant to be supported.

A still further object of the invention resides in the provision of a plant support embodying readily attachable cross pieces having terminal portions so formed for connection with the supporting line wires as to prevent displacement of the cross pieces by the plants.

A still further object of the invention is to provide an improved plant support which may be constructed entirely of wire, thus allowing for the economical manufacture of the supports, and one, owing to the specific construction and features of assemblage, may be used in either a horizontal position or in an inclined or vertical position when employed for the supporting of vines and climbing plants such as sweet peas and the like.

Other objects and advantages of the invention will be apparent during the course of the following detailed description, taken in connection with the accompanying drawing forming a part of this specification and in which drawing:

Figure 1 is a fragmentary top plan view of a section of the assembled support.

Figure 2 is a fragmentary section of one of the supporting line wires, the same being in top plan and showing two of the wire coupling members as applied to the line wire.

Figure 3 is a fragmentary view of one of the supporting line wires and looking at the coupling members from the under side.

Figure 4 is an enlarged fragmentary section on line 4—4 of Figure 1 and illustrating the manner in which the cross pieces or stay wires are connected between adjacent supporting line wires.

Figure 5 is a perspective view of one of the coupling members and showing the formation of the member bent in a manner in which they are applied in spaced relation along the line wires.

Referring to the drawing in detail, and wherein similar reference characters designate corresponding parts throughout the several views, the letter A designates the longitudinal or line wires of the support, B coupling members carried by the wires A, and C cross or stay wires for detachable connection with the coupling members B for connecting adjacent line wires A in parallel alignment.

The line wires A, and any number of which may be employed for the constructing of a support of the desired size, may be formed of wire of a suitable gauge and character which will not be readily affected by water. These longitudinal or line wires A may be anchored in any suitable manner at the ends of the bench or bed in which the flowers are being grown, and in the example shown the wires A have their terminals wound about rods or heavy gauge wire sections 10 which serve for retaining the wires in parallel relation. The terminals of the line wires A may or may not be rigidly secured to the wires 10, and if connected loosely with the wires 10 will permit of adjustment of the spacing between the line wires.

Referring now to the coupling members B which are arranged in spaced relation throughout the length of each of the line wires A, the same are preferably formed of a single length of wire having its terminal portions clamped tightly about the line wires. These wire formed coupling members B intermediate their ends, are bent into the form of a numeral 8 for providing a pair of independent loops or eyes 12 and 14 which project one to each side of the line wire A. The free end 15 of the eye 12 is wound tightly about the line wire as at 16, while the free end 17 of the eye 14 is wound tightly about the line wire as at 18, the coils 16 and 18 being disposed at opposite sides of the eyes 12 and 14. By observing Figure 5 it will be seen that the free end 15 extends below the coupling section 19 between the eyes 12 and 14, while the free end 17 of the eye 14 extends across the top of the coupling connecting section 19. This particular arrangement has been provided for preventing ready distortion of the eyes 12 and 14. These coupling members B may be spaced any suitable distance along the line wires A, but it is preferred that the coupling members be spaced relatively close since such will permit of the holder being used for various kinds of plants by placing of the cross members C in any aligning coupling members when desiring to provide a larger supporting frame for the plants.

Referring now to the cross or stay members C, and which connect adjacent parallel line wires A, the same are also formed of a suitable gauge of wire and are bent at each end to provide U-shaped hooks 20. The terminal portions of the wire extend from the hooks 20 in angular relation, as in Figure 4 for providing guide fingers 21 which will serve for enabling ready connection of the terminals of the stay wires with the eyes of the coupling members B. Thus it will be seen that the hooked ends of the members C are so shaped that the plants when growing, will not readily lift the members C out of the eyes of the line wires. This construction will also allow the support to be used in either a vertical or inclined position for the supporting of climbing plants, since the formation of the ends of the members C will prevent ready disconnection of the members from the couplings B. The stay members C may be of any desired length in accordance with the spacing of the line wires A so that the plant support may be made to suit the particular kind of plants with which the support is to be used.

In assembling the support, the line wires A may first be stretched in parallel relation and spaced suitably for the plants to be supported, after which the stay members C may be easily coupled with the members B for forming a series of longitudinal and transversely aligning frames. The supports may of course be arranged in tiers one above the other and may be built up or assembled during growth of the plants.

The line wires A will also be found adaptable for use in connection with the staking of plants such as chrysanthemums, and when used as such, the stakes may be passed through one of the eyes 12 or 14 and into the ground adjacent the plants, and which will eliminate the necessity of tying the stakes to the supporting line wire.

From the foregoing description it will be apparent that a novel type of assembled plant support has been provided which may be quickly assembled and remain so during growth of the plants being supported thereby, and which support is of a nature to be readily adapted for use with various types of plants.

Changes in detail may be made to the specific form of the invention herein shown and described, without departing from the spirit of the invention or the scope of the following claims.

I claim:

1. A plant support comprising a series of horizontally supported line wires, coupling members connected in equal spaced relation upon the line wires and each being formed with a pair of eyes arranged horizontally one at each side of the line wire, and stay wires for connecting adjacent line wires in parallel relation having hook shaped ends releasably engageable in the eyes of coupling members and terminating in depending angularly offset guide fingers.

2. A plant support comprising a series of horizontally supported line wires, coupling members connected in spaced relation upon each line wire embodying wire sections looped intermediate their ends for forming a pair of independent eyes and having their terminal portions wound in opposite directions about the line wires, and wire cross members for connecting adjacent line wires in parallel relation and having hook shaped ends releasably engageable in the eyes of the coupling members.

3. A plant support comprising a series of line wires, wire coupling members carried by the line wires, each consisting of a length of wire looped intermediate its ends for forming independent eyes projecting one to each side of the line wire and with the terminals of the wire coupling member wound about the line wire at opposite sides of the eyes, and cross wires for connecting adjacent line wires in parallel relation and having U-shaped terminals releasably engageable in the eyes of the coupling members.

4. A plant support comprising a series of line wires, wire formed coupling members supported on the line wires, each consisting of a length of wire looped into the form of an 8 at its intermediate portion and having its terminal portions secured to the line wire, and cross wires having hook shaped terminals releasably engageable in the eyes formed by the looping of the wire coupling members for connecting adjacent line wires in parallel relation.

ROBERT C. McOLVIN.